United States Patent [19]

Kargula

[11] Patent Number: 5,730,475
[45] Date of Patent: Mar. 24, 1998

[54] QUICK CONNECT FLUID COUPLING WITH COLLET RETAINER

[75] Inventor: Christopher J. Kargula, Sterling Heights, Mich.

[73] Assignee: Form Rite, Auburn Hills, Mich.

[21] Appl. No.: 543,216

[22] Filed: Oct. 13, 1995

[51] Int. Cl.⁶ .................................................. F16L 37/088
[52] U.S. Cl. .......................... 285/308; 285/319; 285/321; 285/323
[58] Field of Search ........................... 285/305, 307, 285/308, 319, 321, 322, 323, 332

[56] References Cited

U.S. PATENT DOCUMENTS

| | | |
|---|---|---|
| 3,530,685 | 9/1970 | Ehret .................................. 285/321 X |
| 3,948,548 | 4/1976 | Voss ........................................ 285/321 |
| 4,240,654 | 12/1980 | Gladieux . |
| 4,526,411 | 7/1985 | Bartholomew . |
| 4,802,697 | 2/1989 | Bartholomew . |
| 4,889,368 | 12/1989 | Laipply . |
| 4,913,467 | 4/1990 | Washizu . |
| 4,915,420 | 4/1990 | Washizu . |
| 4,925,217 | 5/1990 | Ketcham . |
| 4,946,205 | 8/1990 | Washizu . |
| 4,948,175 | 8/1990 | Bartholomew . |
| 4,948,176 | 8/1990 | Bartholomew . |
| 4,948,180 | 8/1990 | Usui et al. . |
| 4,979,765 | 12/1990 | Bartholomew . |
| 5,000,614 | 3/1991 | Walker et al. . |
| 5,022,687 | 6/1991 | Ariga .................................... 285/321 |
| 5,024,468 | 6/1991 | Burge . |
| 5,042,848 | 8/1991 | Shiozaki ............................ 285/323 X |
| 5,069,424 | 12/1991 | Dennany, Jr. et al. . |
| 5,098,136 | 3/1992 | Washizu .............................. 285/319 |
| 5,160,179 | 11/1992 | Takagi . |
| 5,181,751 | 1/1993 | Kitamura ........................... 285/308 X |
| 5,195,787 | 3/1993 | Bartholomew . |
| 5,211,427 | 5/1993 | Washizu . |
| 5,232,252 | 8/1993 | Bartholomew . |
| 5,273,323 | 12/1993 | Calmettes et al. . |
| 5,303,963 | 4/1994 | McNaughton et al. . |
| 5,320,390 | 6/1994 | Kodama et al. ................... 285/319 X |
| 5,322,330 | 6/1994 | Remsburg . |
| 5,324,082 | 6/1994 | McNaughton et al. . |
| 5,354,103 | 10/1994 | Torrence et al. . |
| 5,354,106 | 10/1994 | Washizu et al. . |
| 5,401,063 | 3/1995 | Plosz . |

FOREIGN PATENT DOCUMENTS 2089455  6/1982  United Kingdom ................... 285/308

Primary Examiner—Terry Lee Melius
Assistant Examiner—Heather Shackelford
Attorney, Agent, or Firm—Howard & Howard

[57] ABSTRACT

A quick connect coupling generally comprises a housing having an axial bore extending inwardly from an entrance and increasing in diameter moving into the housing. A tube has a tube bead of increased diameter spaced from an inner end of the tube and is insertable into the bore. A generally annular radially expandable collet disposed within the bore expands upon insertion of the tube and contracts onto the tube outwardly of the tube bead. The collet functions as a wedge between the tube bead and the increasing diameter portion of the housing, thereby retaining the tube within the housing. In one embodiment, a spring disposed within the housing biases the collet toward the entrance of the housing, ensuring proper position of the collet in extreme conditions. The inventive collet allows smaller tube bead diameters to be used.

18 Claims, 4 Drawing Sheets

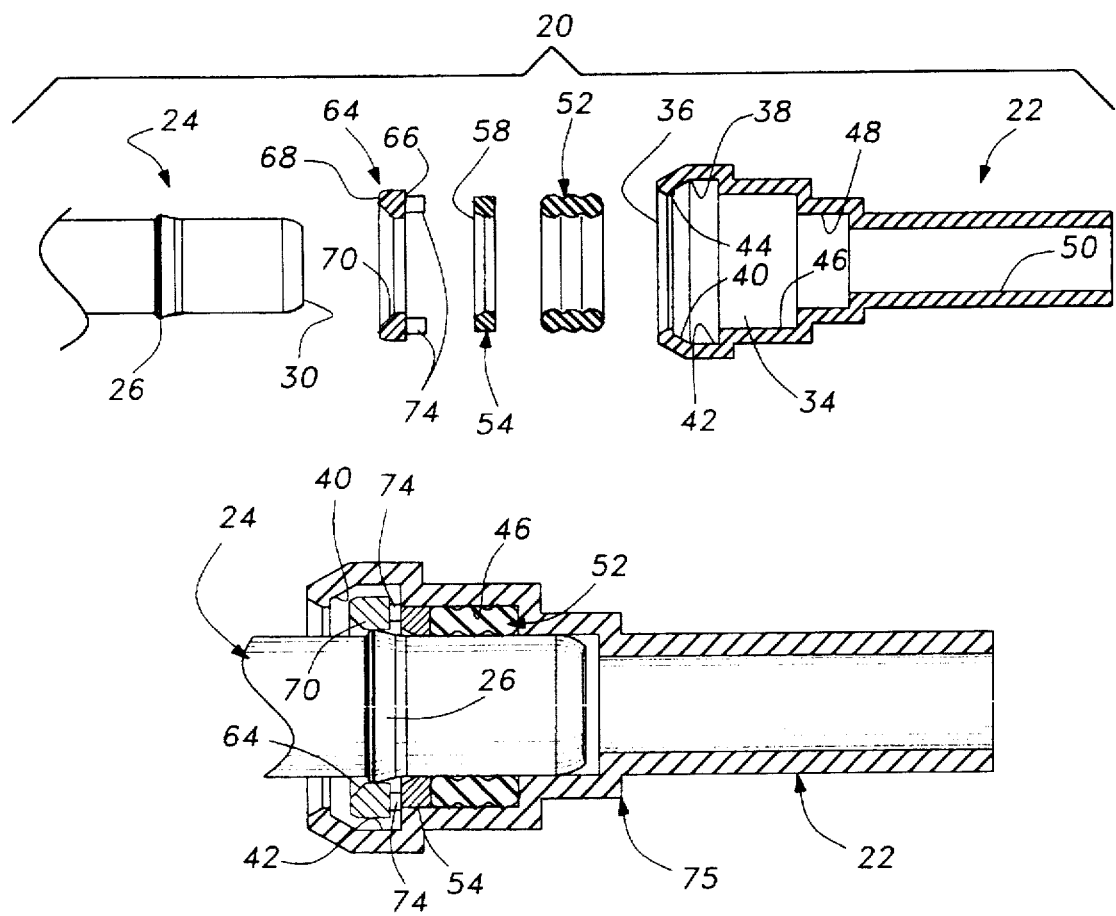
Fig-1
Fig-2
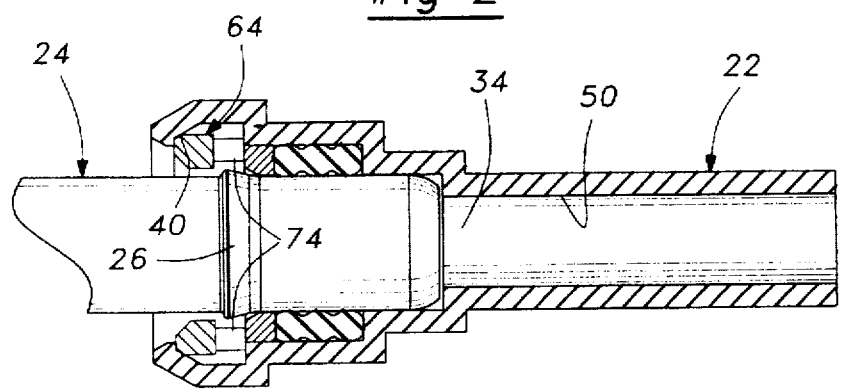
Fig-3

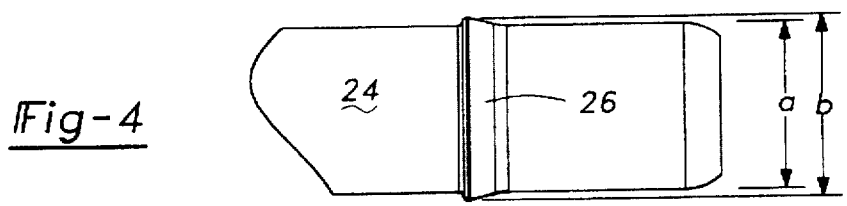
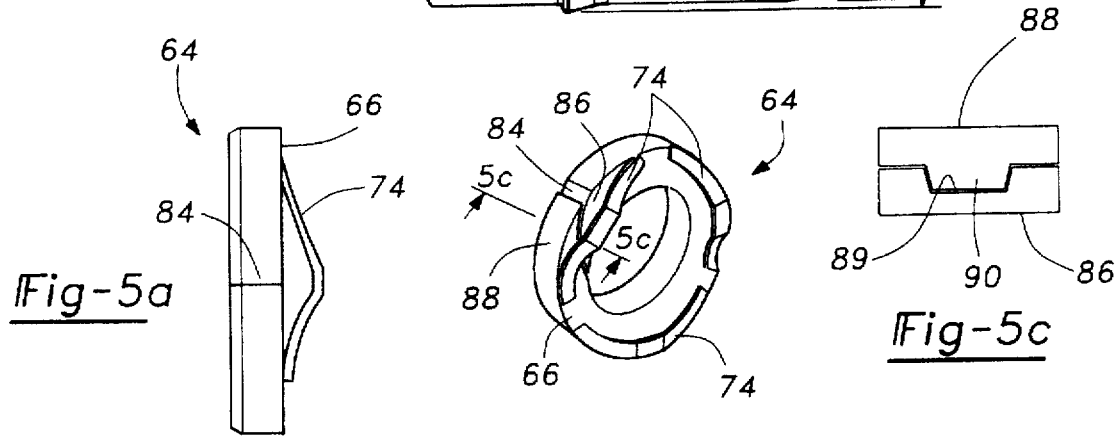
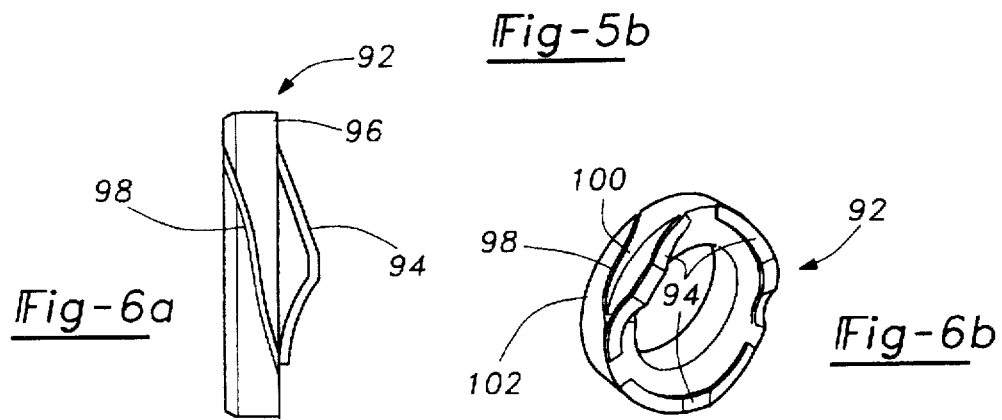
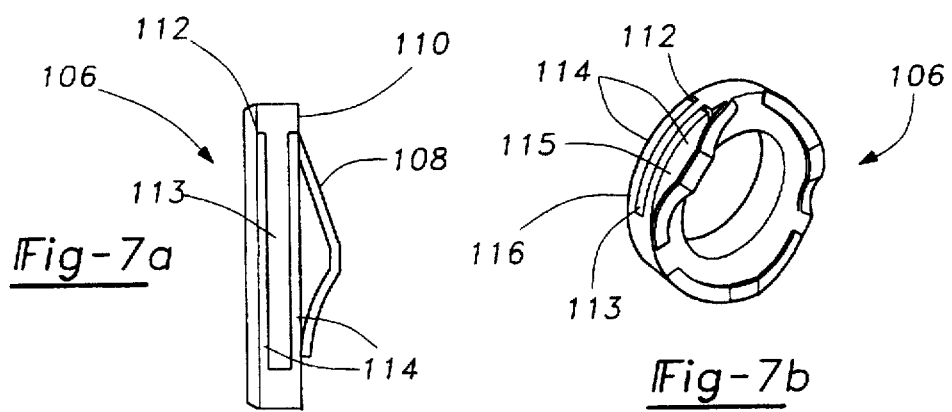

QUICK CONNECT FLUID COUPLING WITH COLLET RETAINER

BACKGROUND OF THE INVENTION

The present invention relates to a quick connect fluid coupling with an improved retainer that secures the tube bead over its entire circumference.

Quick connect couplings are used to quickly and securely connect a tube within a housing bore or to a second tube. Quick connect couplings are utilized in most modern vehicles to connect brake lines, air conditioning lines, power steering lines and other high-pressure and vacuum lines.

In standard quick connect couplings a retainer is received within a female housing bore. The retainer has a plurality of arms which extend radially inwardly in a direction moving axially into the bore. The tube has a radially greater diameter bead which moves into the bore and flexes the arms outwardly. The axially and radially innermost ends of the arms define an inner diameter approximately equal to the other diameter of the tube at locations other than the bead. As the tube is inserted further into the bore, the bead forces the arms radially outwardly, and moves axially past the arms. Once the bead has moved axially beyond the arms, the arms spring back to a position where they are radially outwardly of the tube, and axially between the tube bead and outer end of the bore. The tube is then fully inserted, and the retainer securely retains the tube within the housing.

While quick connect couplings having flexible arms that latch behind the bead are widely used, they do have some deficiencies. The retention is limited to the specific contact points at the circumferentially spaced ends of the arms. Also, these retainers vary from design to design and their operation is highly dependent on the material, length, angle, thickness, and the number of arms. Temperature extremes diminish the effectiveness of the arms. The spaced arms become brittle when cold and softened when hot. Also, the flexible arms trap the tube in the connector, but do not offer significant side load support to the coupling. Further the flexible arms require a relatively large insertion distance because the tube bead must be inserted past the flexible arms.

The height of the tube bead must be relatively large to provide enough surface on the side of the bead for the flexible arms to latch. The height remains relatively constant across various tube diameters. Therefore, the smaller the tube diameter, the larger the percentage of deformation radially outwardly of the tube material. The material of the tubes typically fails if deformed more than 50%. For tubes of relatively small diameter, such as less than 1/41", the tube bead has typically been deformed up to 35% to 40%. At larger tube diameters, such as greater than 1/2", the tube bead is deformed over 15%. In one known type tube having a diameter of 5/16" or 3/8", the beads are typically deformed 32%.

In one knowns type of tube, a 5/16" tube diameter had a 0.05"height tube bead, or 32% deformation. In that same type of tube, a 3/8" tube diameter required a 0.06"tube bead height, or 32% deformation. In one other standard prior art quick connect tube, a 5/16" tube required 0.062"tube bead height, or 39% deformation. A 3/8" tube diameter had a 0.065"tube bead height, or 35% deformation. A 3/4" tube diameter required 0.070"tube bead height, or 19% deformation. A 1"tube diameter required a 0.080"tube bead height, or 16% deformation.

The excessive deformation thus weakens the tube near the tube bead, and provides a source of potential failure. The large beads are needed since the retainer only contacts the tube at circumferentially spaced points.

It has been proposed to utilize a collet retainer disposed within an axial bore of the connector housing. The proposed collet generally comprises a ring having a split to provide radial expendability. Upon insertion of the tube into the housing, the collet is expanded radially by the tube bead. After the tube bead is inserted past the collet, the collet contracts onto the tube behind the tube bead. Often the collet does not contact the entire circumference of the bead.

In one quick connect coupling, when the coupling is pressurized, the collet slides under a ledge in the housing which prevents the collet from expanding radially. However when the quick connect coupling is not pressurized, the collet may inadvertently expand radially and release the tube. Thus, the proposed collets have not been successfully utilized.

SUMMARY OF THE INVENTION

The present invention provides a quick connect coupling which ensures the proper positioning of a radially expandable collet retainer to prevent the inadvertent release of the tube. A practical collet retainer provides a secure connection around the majority of the tube bead circumference. Thus, a smaller tube bead may be used that does not result in material fatigue. The quick connect coupling generally includes a housing having an axial bore extending into the housing and expanding from an entrance. A tube having a tube bead of increased diameter is insertable into the axial bore of the housing. The tube is retained within the housing by a radially expandable collet disposed within the housing bore. The collet acts as a wedge between the tube bead and the housing over the entire circumference of the tube bead. In one embodiment, a spring within the housing biases the collet toward the entrance of the housing, thereby keeping the collet in proper position. In another embodiment, no spring is used.

The inventive collet retainer is relatively insensitive to variation compared to known quick connect retainers using flexible arms. Since the collet retainer provides a wedge between the tube bead and the housing around the entire circumference of the bead, there is more margin for manufacturing tolerances. Preferably, the collet is normally contracted and is sufficiently biased toward a contracted state to retain the collet between the tube bead and the housing. In one embodiment which can be used in extreme conditions, the spring biases the collet against a portion of the housing, thereby ensuring the proper positioning of the collet within the housing and preventing the inadvertent radial expansion of the collet. The inventive quick connect coupling provides stronger side load support to the connection while also permitting a shorter insertion distance of the tube into the housing because the collet provides support to the connection around the entire diameter of the tube. With the inventive collet, the diameter of the tube bead need be increased less than 20% for tube diameters under 1/2", and preferably only 5% to 15% for tube diameters 1/2 or greater.

BRIEF DESCRIPTION OF THE DRAWINGS

The above, as well as other advantage of the present invention, will become readily apparent to those skilled in the art from the following detailed description of a preferred embodiment when considered in light of the accompanying drawings in which:

FIG. 1 is an exploded, partially sectioned view of a quick connect coupling of the present invention;

FIG. 2 is a cross-sectional view of the quick connect coupling of FIG. 1 during insertion of the tube into the housing;

FIG. 3 is a cross-sectional view of the quick connect coupling of FIG. 1 after connection of the tube to the housing;

FIG. 4 is an enlarged side view of the tube shown in FIG. 1;

FIG. 5a is a side view of the collet shown in FIG. 1;

FIG. 5b is a perspective view of the collet shown in FIG. 5a;

FIG. 5c is a cross-sectional view of the collet shown in FIG. 5a taken along line 5c–5c;

FIG. 6a is a side view of an alternative collet;

FIG. 6b is a perspective view of the collet shown in FIG. 6a;

FIG. 7a is a side view of an alternative collet;

FIG. 7b is a perspective view of the collet shown in FIG. 7a;

DETAILED DESCRIPTION OF A PREFERRED EMBODIMENT

Figure 8A:
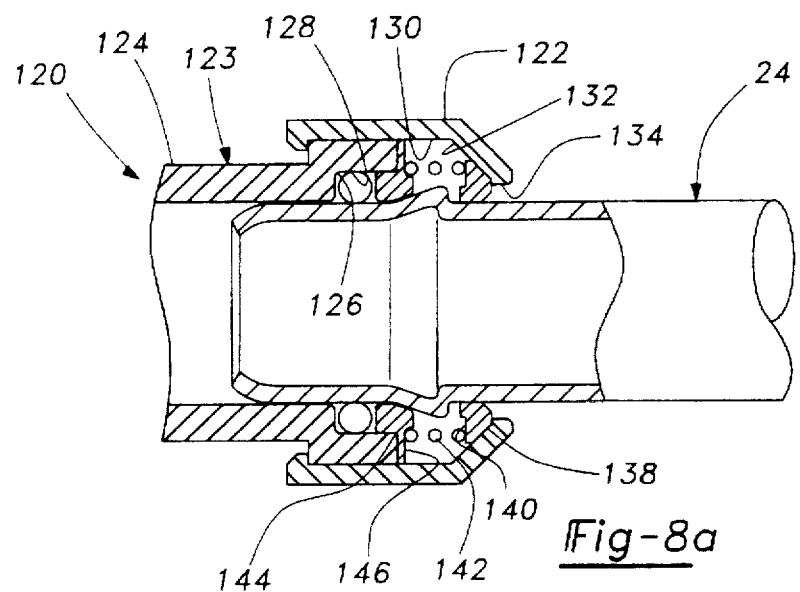
FIG. 8a is a cross-sectional view of an alternative 6-piece quick connect coupling of the present invention.

A quick connect coupling 20 is shown generally in FIG. 1. The quick connect coupling 20 generally comprises a housing 22 for connection with a tube 24. The tube 24 has a radially greater diameter tube bead 26 spaced from an inner end 30 of the tube 24. The housing 22 includes an axial bore 34 extending inwardly into the housing 22 from an entrance 36. The axial bore 34 includes a first portion 38 of increased diameter inside the entrance 36. The first portion 38 includes a tapered portion 40 between the entrance 36 and a portion 42 of relatively large diameter. The tapered portion 40 further includes an annular ridge 44 at the entrance 36.

Axially inward of the first portion 38 is a seal cavity portion 46 of reduced diameter. Spaced axially inwardly of the seal cavity portion 46 is a further reduced portion 48 for receiving the inner end 30 of the tube 24, followed by a further reduced conduit portion 50.

A seal 52 is received within the seal cavity portion 46. An annular pilot 54 includes an inner surface 58 tapered inwardly moving into the housing 22. An annular radially expandable collet 64 is generally a split ring having an axial inner end 66 and an opposite outer end 68. The collet 64 preferably includes an inner surface 70 tapered inwardly moving into the housing 22. A spring 74 is preferably integrally molded onto the inner end 66 of the collet 64.

As can be seen in FIG. 2, the seal 52, pilot 54, and collet 64 are assembled within the housing 22 to form a housing assembly 75. The seal 52 is inserted into the seal cavity portion 46 of the housing 22 and the pilot 54 is inserted into the seal cavity portion 46, axially outward of the seal 52. The collet 64 is inserted into the first portion 38 of the bore 34, with the spring 74 biasing the collet 64 axially outwardly against the tapered portion 40 of the housing 22. During insertion of the tube 24 into the housing assembly 75, the tube bead 26 engages the inner surface 70 of the collet 64, thereby moving the collet axially into the housing 22 and compressing the spring 74. At some point, the spring and pilot resist further inward movement of the collet 64. At that point the collet 64 begins to expand radially into the large diameter portion 42, as will be explained below.

Referring to FIG. 3, after complete insertion of the tube 24 into the housing 22, the collet 64 contracts radially inwardly behind the tube bead 26. The collet 64 is biased against the tapered portion 40 of the axial bore 34 by the spring 74, thereby ensuring the proper position of the collet 64. The tube 24 is preferably retained within the housing 22 adjacent the conduit portion 50. The quick connect coupling 20 is sealed by the seal 52 between the tube 24 and housing 22.

When pressure is applied to the connection the tube will typically be driven to the left against the collet 64. Since the collet is driven to wedge against the ramped surface 40, this increases the strength of the connection.

As can be seen in FIG. 4, the inventive tube 24 permits a tube bead 26 which is smaller than the known tube beads. For a tube diameter of 5/16", only a 0.027" tube bead is required, making the greatest outer diameter b of the tube bead 26 117% of the diameter a of the tube 24. Thus, less than 20% expansion is required. For a tube diameter a of 1/8", only a 16% expansion to form a 0.03" tube bead is required. For a tube diameter a of 3/4", only a 9% expansion to form a 0.035"tube bead is required. For a tube diameter a of 1", only a 9% expansion to form a 0.045"tube bead is required. These smaller tube beads are possible because the collet 64 acts upon the entire circumference of the tube bead 26. In extreme conditions, the spring 74 can be used to ensure that the collet is properly positioned at all times. Because the tube 24 is less deformed radially outwardly to form the tube bead 26, the material of the tube 24 near the tube bead 26 is stronger than the known tubes, which required tube beads having larger diameters, which typically must be more than 130% of the tube diameter.

FIG. 5a shows the collet 64 having an integral spring 74 formed on an inner end 66. As can be seen in FIG. 5b, the collet 64 is generally annular and includes a split 84 forming a first arm 86 and a second arm 88 such that the first arm 86 is normally radially inward of the second arm 88. As can be seen in FIG. 5c, the first arm 86 includes a groove 89 interlocking with a tongue 90 formed on the second arm 88. The collet expands upon tube insertion with the arm 86 moving relative to the arm 88 to allow the tube bead to move beyond the collet. The tongue and groove connection guides the arms during this movement.

It should be understood that the collet can be made expandable in different ways. Referring to FIG. 6a, an alternative collet 92 includes an integral spring 94 on an inner end 96. As can be seen from FIG. 6b, the collet 92 is generally annular and includes a helical split 98 forming a first arm 100 and a second arm 102 such that the first arm 100 is axially inward of the second arm 102. The helical split will guide the arms during radial expansion.

Referring to FIG. 7a, an alternative collet 106 includes an integral spring 108 formed on an inner end 110. The collet 106 includes a split 112 forming a first arm 113 and a second arm 114. As can be seen in FIG. 7b, the second arm 114 includes an axially inner prong 115 and an axially outer prong 116. The first arm 113 is slidable and guided between the inner prong 115 and outer prong 116 of the second arm 114, thereby permitting the radial expansion of the collet 106.

Figure 8B:
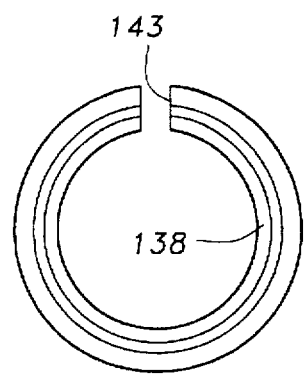
FIG. 8b shows the collet of the FIG. 8a embodiment.

As can be seen in FIG. 8a, the quick connect coupling 120 could alternatively be formed utilizing a six piece assembly 122 generally including a housing 123 having a conduit portion 124 and a portion 126 of increased diameter forming a seal cavity 128. A first portion 130 of increasing diameter is formed as a separate hub piece and includes a tapered portion 132 adjacent an entrance 134. An alternate collet 138 includes an annular recess 140 which receives a spring 142, such as a coil spring, disposed within the first portion 130. The collet 138 also has at least one split 143 to allow radial expansion, as shown in FIG. 8b. An alternate pilot 144 also includes an annular recess 146 for receiving the spring 142.

Figure 9:
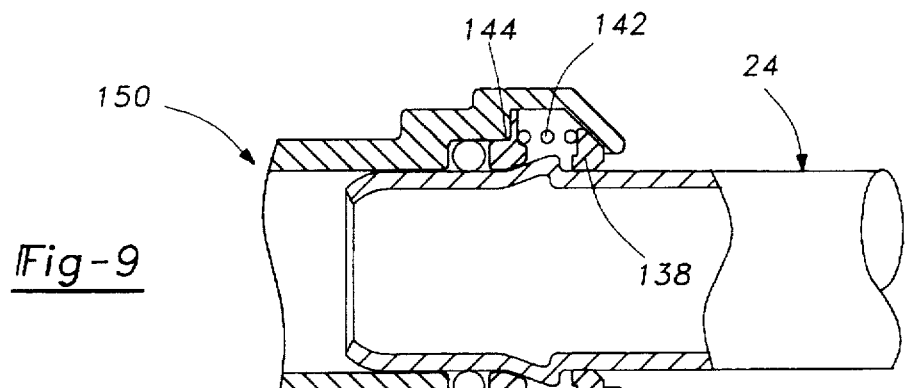
FIG. 9 is a cross-sectional view of an alternative 5-piece quick connect coupling of the present invention.

Referring to FIG. 9, an alternate quick connect coupling 150 includes a five-piece assembly 151 utilizing an integral housing 152.

Figure 10:
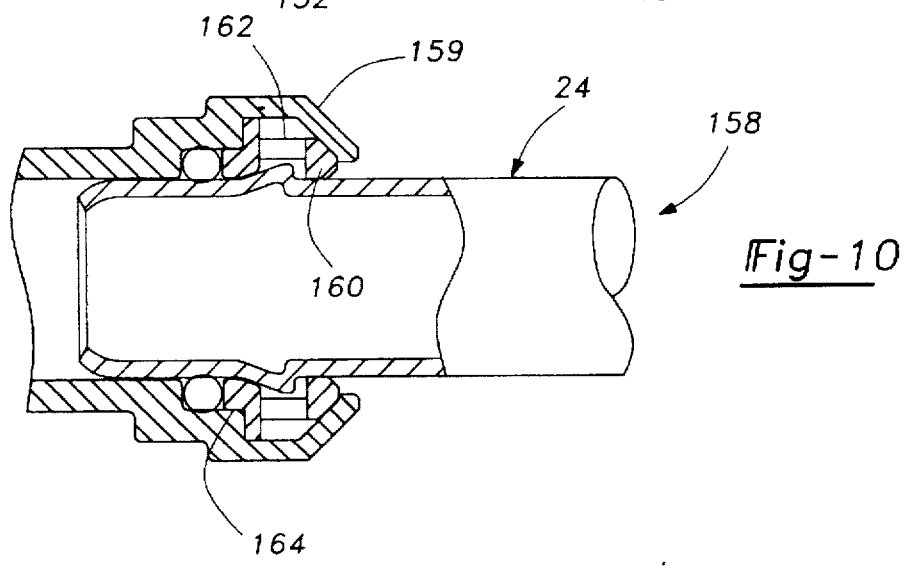
FIG. 10 is a cross-sectional view of an alternative 4-piece quick connect coupling of the present invention.

Referring to FIG. 10, an alternate quick connect coupling 158 includes a four-piece assembly 159. The collet 160 is formed with an integral spring 162 as discussed above. The pilot 164 need not include an annular recess.

Figure 11:
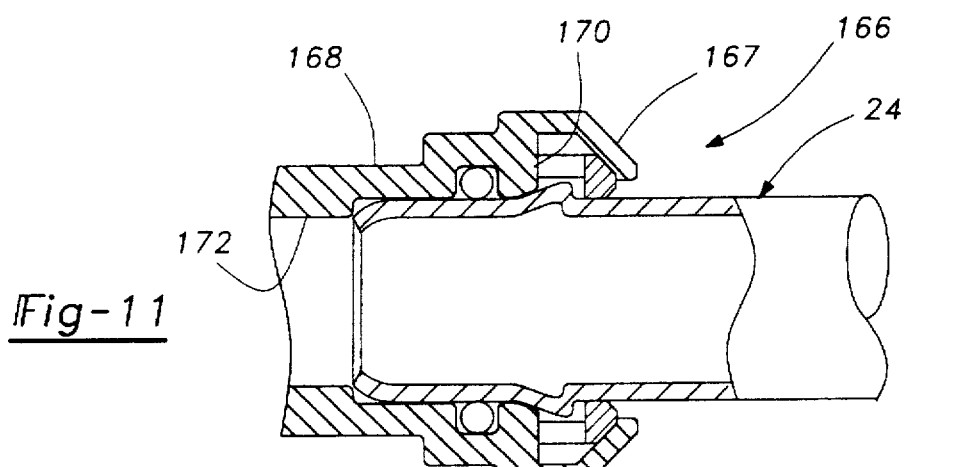
FIG. 11 is a cross-sectional view of an alternative 3-piece quick connect coupling of the present invention.

Referring to FIG. 11, an alternate quick connect coupling 166 includes a three piece housing assembly 167. In the three piece assembly 167, the housing 168 is formed with an integral pilot portion 170 extending radially into the axial bore 172.

Figure 12A:
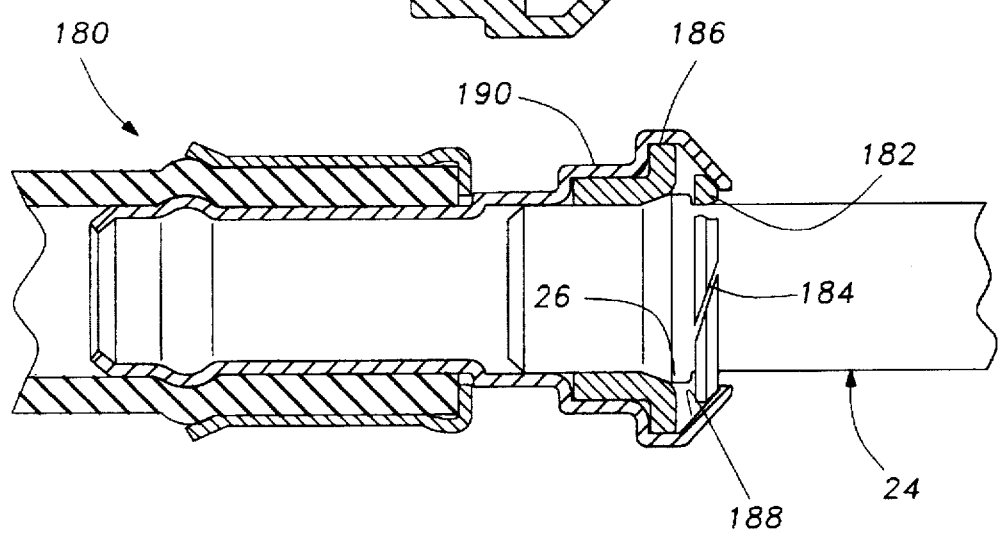
FIG. 12A is an alternative, springless quick connect coupling, partially broken away.
Figure 12B:
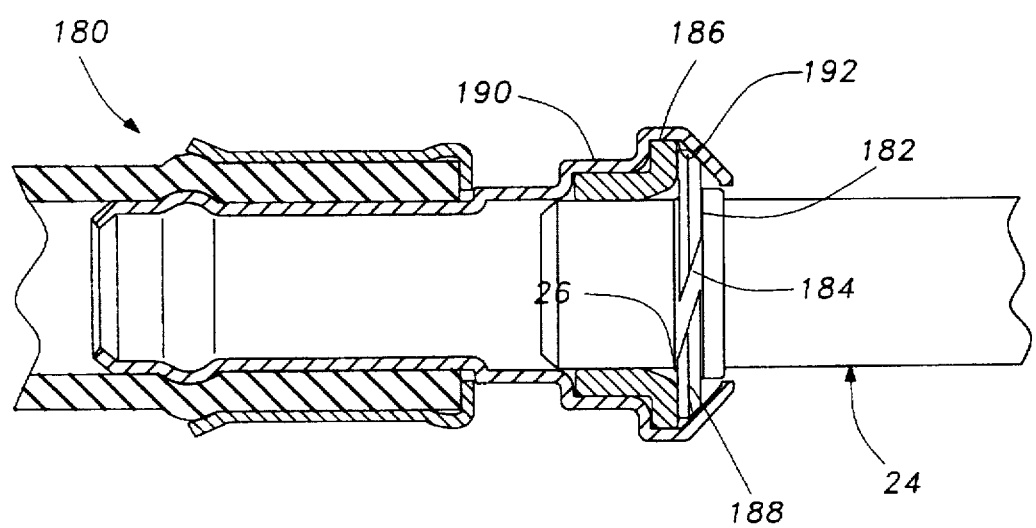
FIG. 12B is the quick connect coupling of FIG. 12A during insertion of the tube into the housing.

Referring to FIG. 12A, a springless quick connect coupling 180 includes an alternative collet 182 having a split 184, and alternative pilot 186. The collet 182 contracts to its natural diameter behind the tube bead 26 and abuts the ramped portion 188 of the housing 190. During use, any force tending to pull the tube 24 outwardly of the housing 190 will cause the collet 182 to tighten around the tube 24 as it wedges against the ramped portion 188 of the housing 190. Referring to FIG. 12B, the split 184 allows the collet 182 to expand radially into a portion 192 of increased diameter during insertion of the tube 24 into the housing 190.

Known materials may be selected for the components of this invention. The collet may be formed of a material such that it has sufficient temperature resistance to function as described.

In accordance with the provisions of the patent statutes, the present invention has been described in what is considered to represent its preferred embodiment. However, it should be noted that the invention can be practiced otherwise than is specifically illustrated and described without departing from its spirit or scope.

What is claimed is:

1. A quick connect coupling comprising:
   a housing defining an axial bore extending inwardly into said housing from an entrance;
   a tube having a tube bead of increased diameter formed on said tube, said tube insertable into said bore;
   a radially expandable annular collet, said collet disposed within said bore, said collet being expanded radially outward by said tube bead upon insertion of said tube into said bore, said collet contracting radially inwardly at a position axially outward of said tube bead to retain said tube within said bore; and
   a spring disposed within said bore, said spring biasing said collet axially outward toward said entrance of said housing, said spring being formed integrally with said collet.

2. The quick connect coupling of claim 1, wherein an axially outer face of said collet is ramped and is biased into a ramped wedge surface by said spring to provide a secure connection.

3. The quick connect coupling of claim 1, wherein said bead has an outer diameter and said tube has an outer diameter, such that said bead diameter is less than about 120% of said tube diameter for tube diameters less than about ½".

4. The quick connect coupling of claim 1, wherein said collet is a generally cylindrical member, a split extending through the entire body of said collet at one circumferential location to allow radial expansion, and a portion of said collet providing contact with the tube bead around substantially the entire tube bead circumference.

5. The quick connect coupling of claim 1 wherein said bead has an outer diameter and said tube has an outer diameter, such that said bead diameter is less than about 115% of said tube diameter for tube diameters less than or about equal to ½".

6. A quick connect coupling comprising:
   a housing defining an axial bore extending inwardly into said housing from an entrance;
   a tube having a tube bead of increased diameter formed on said tube, said tube insertable into said bore;
   a radially expandable collet comprising a generally continuous annular ring having a generally helical split allowing radial expansion, said collet disposed within said bore, said collet being expanded radially outward by said tube bead upon insertion of said tube into said bore, said collet contracting radially inwardly at a position axially outward of said tube bead to retain said tube within said bore; and
   a spring disposed within said bore, said spring biasing said collet axially outward toward said entrance of said housing.

7. A quick connect coupling comprising:
   a housing defining an axial bore extending inwardly into said housing from an entrance;
   a tube having a tube bead of increased diameter formed on said tube, said tube insertable into said bore;
   a radially expandable collet comprising a generally continuous annular ring having a split allowing radial expansion, interlocking arms defined by said split, said collet disposed within said bore, said collet being expanded radially outward by said tube bead upon insertion of said tube into said bore, said collet contracting radially inwardly at a position axially outward of said tube bead to retain said tube within said bore; and
   a spring disposed within said bore, said spring biasing said collet axially outward toward said entrance of said housing.

8. The quick connect coupling of claim 7 wherein said interlocking arms include a tongue and groove connection.

9. The quick connection coupling of claim 7 wherein said interlocking arms include a pair on axially inner and outer prongs defined on one circumferential side of said split and a central arm received between said inner and outer prongs and on an opposed side of said split.

10. A quick connect coupling comprising:
    a housing defining an axial bore extending inwardly into said housing from and entrance, and including a ramped portion adjacent said entrance;
    a tube having a tube bead of increased diameter formed on said tube, said tube insertable into said bore; and a radially expandable annular collet disposed within said bore, said collet being expanded radially outward by said tube bead during insertion of said tube into said housing, said collet contracting radially inwardly onto said tube axially outward of said tube bead to retain said tube within said bore, and said collet including a portion in contact with said ramped portion of said bore when said tube is received in said housing, wherein said collet is a generally cylindrical member, a split extending through the entire body of said collet at one circumferential location to allow radial expansion, and a portion of said collet providing contact with the tube bead around substantially the entire tube bead circumference.

11. The quick connect coupling of claim 10 further including a spring disposed within said bore, said spring biasing said collet axially outward against said ramped portion.

12. The quick connect coupling of claim 10 wherein said collet is a split ring.

13. The quick connect coupling of claim 10 wherein said bead has an outer diameter and said tube has an outer diameter, such that said bead diameter is less than about 120% of said tube diameter for tube diameters less than about ½".

14. The quick connect coupling of claim 10 wherein said bead has an outer diameter and said tube has an outer diameter, such that said bead diameter is less than about 115% of said tube diameter for tube outer diameters less than or about equal to ½".

15. A quick connect coupling comprising:

a housing defining an axial bore extending inwardly into said housing from an entrance;

a tube having a nominal diameter formed on said tube at a predetermined distance from said inner end, such that said bead diameter is less than 120% of said nominal diameter for nominal diameters less then ½", and such that said bead diameter is less than 115% of said nominal diameter for nominal diameters greater than or equal to ½", said tube insertable into said bore; and a radially expandable annular collet, said collet disposed within said bore, said collet being expanded radially outwardly by said tube bead during insertion of said tube into said housing, said collet contracting radially inwardly onto said tube axially outward of said tube bead to retain said tube within said bore;

a spring disposed within said bore, said spring biasing said collet axially outward toward said entrance of said housing, said spring being formed integrally with said collet.

16. The quick connect coupling of claim 15 wherein said nominal diameter is 5/16" and said tube bead is less than 1/32".

17. The quick connect coupling of claim 15 wherein said nominal diameter is ⅜" and said tube bead is less than 1/32".

18. The quick connect coupling of claim 15 wherein said nominal diameter is greater than ½" and said tube bead is less than 3/64".

* * * * *